United States Patent
Zhuang et al.

(10) Patent No.: US 11,231,362 B1
(45) Date of Patent: Jan. 25, 2022

(54) MULTI-ENVIRONMENT POLARIZED INFRARED REFLECTOMETER FOR SEMICONDUCTOR METROLOGY

(71) Applicant: KLA Corporation, Milpitas, CA (US)

(72) Inventors: Guorong V. Zhuang, San Jose, CA (US); Shankar Krishnan, Santa Clara, CA (US); David Y. Wang, Santa Clara, CA (US); Xuefeng Liu, San Jose, CA (US); Mengmeng Ye, Shanghai (CN); Dawei Hu, Shanghai (CN)

(73) Assignee: KLA Corporation, Milpitas, CA (US)

( * ) Notice: Subject to any disclaimer, the term of this patent is extended or adjusted under 35 U.S.C. 154(b) by 103 days.

(21) Appl. No.: 16/723,565

(22) Filed: Dec. 20, 2019

Related U.S. Application Data

(60) Provisional application No. 62/782,515, filed on Dec. 20, 2018.

(51) Int. Cl.
    *G01N 21/55*    (2014.01)
    *G01N 21/35*    (2014.01)
    *G01N 21/21*    (2006.01)
    *G01N 21/3563*  (2014.01)

(52) U.S. Cl.
    CPC ....... *G01N 21/3563* (2013.01); *G01N 21/211* (2013.01); *G01N 21/55* (2013.01); *G01N 2021/213* (2013.01); *G01N 2021/3568* (2013.01); *G01N 2021/3595* (2013.01)

(58) Field of Classification Search
    CPC .. G01N 21/211; G01N 21/3563; G01N 21/55; G01N 2021/213; G01N 2021/3568; G01N 2021/3595
    See application file for complete search history.

(56) References Cited

U.S. PATENT DOCUMENTS

| | | | |
|---|---|---|---|
| 5,608,526 A | 3/1997 | Piwonka-Corle et al. | |
| 5,859,424 A | 1/1999 | Norton et al. | |
| 6,429,943 B1 | 8/2002 | Opsal et al. | |
| 7,478,019 B2 | 1/2009 | Zangooie et al. | |
| 7,933,026 B2 | 4/2011 | Opsal et al. | |
| 8,860,937 B1 | 10/2014 | Dziura et al. | |
| 8,873,050 B1 * | 10/2014 | Flock | G01J 3/36 |
| | | | 356/328 |
| 9,116,103 B2 | 8/2015 | Wang et al. | |
| 9,146,156 B2 | 9/2015 | Zhuang et al. | |
| 9,243,886 B1 * | 1/2016 | Kuznetsov | G03F 7/70625 |
| 9,291,554 B2 | 3/2016 | Kuznetsov et al. | |
| 9,518,916 B1 * | 12/2016 | Pandev | G01N 21/255 |
| 9,526,158 B1 | 12/2016 | Bezel et al. | |
| 9,739,702 B2 | 8/2017 | Bringoltz et al. | |
| 9,915,522 B1 | 3/2018 | Jiang et al. | |
| 10,041,873 B2 | 8/2018 | Krishnan | |
| 2009/0279091 A1 * | 11/2009 | Levinski | G03F 7/70633 |
| | | | 356/399 |

(Continued)

*Primary Examiner* — Mark R Gaworecki
(74) *Attorney, Agent, or Firm* — Hodgson Russ LLP

(57) ABSTRACT

A system includes a light source, a Fourier transform infrared reflectometer (FTIR) spectrometer, and broadband reflectometer optics. The system is configured to measure polarized light and unpolarized reflectivities in a wavelength range from 2 μm to 20 μm. The light source can be a laser-driven light source. The spectroscopic reflectometer can include a single channel or two channels.

20 Claims, 9 Drawing Sheets

(56) References Cited

U.S. PATENT DOCUMENTS

| | | | |
|---|---|---|---|
| 2013/0033704 A1* | 2/2013 | Zhuang | G01J 3/0264 356/138 |
| 2013/0342831 A1* | 12/2013 | Levinski | G01N 21/47 356/237.1 |
| 2014/0172394 A1 | 6/2014 | Kuznetsov et al. | |
| 2015/0042984 A1* | 2/2015 | Pandev | G03F 9/7026 356/124 |
| 2015/0046118 A1* | 2/2015 | Pandev | H01L 22/12 702/155 |
| 2015/0046121 A1* | 2/2015 | Dziura | G01N 21/9501 702/179 |
| 2015/0058813 A1* | 2/2015 | Kim | H01L 22/12 716/52 |
| 2015/0323471 A1* | 11/2015 | Sapiens | G01N 21/95607 356/73 |
| 2016/0047744 A1* | 2/2016 | Adel | G01B 11/272 356/401 |
| 2016/0139032 A1* | 5/2016 | Rampoldi | G01N 21/9501 356/73 |
| 2016/0377412 A1* | 12/2016 | Li | G01B 11/0608 356/630 |
| 2017/0356800 A1* | 12/2017 | Krishnan | G01N 21/211 |
| 2018/0088040 A1* | 3/2018 | Krishnan | G01J 3/0229 |
| 2018/0238814 A1* | 8/2018 | Sapiens | G01J 3/36 |
| 2019/0107384 A1* | 4/2019 | Ygartua | G01B 11/0641 |

\* cited by examiner

MULTI-ENVIRONMENT POLARIZED INFRARED REFLECTOMETER FOR SEMICONDUCTOR METROLOGY

CROSS-REFERENCE TO RELATED APPLICATIONS

This application claims priority to the provisional patent application filed Dec. 20, 2018 and assigned U.S. App. No. 62/782,515, the disclosure of which is hereby incorporated by reference.

FIELD OF THE DISCLOSURE

This disclosure relates to semiconductor metrology.

BACKGROUND OF THE DISCLOSURE

Evolution of the semiconductor manufacturing industry is placing greater demands on yield management and, in particular, on metrology and inspection systems. Semiconductor device critical dimensions (CD) continue to shrink, profiles become more complex, and vertical dimensions continue to increase, yet the industry needs to decrease time for achieving high-yield, high-value production. Improved measurement sensitivity is needed. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various vertical features and multiple levels of the device structures. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Metrology may be used during semiconductor manufacturing to take various measurements of, for example, a semiconductor wafer or reticle during various process steps to form devices. Metrology tools can be used to measure structural and material characteristics associated with various semiconductor fabrication processes. For example, the metrology tools can measure material composition or can measure dimensional characteristics of structures and films such as film thickness, critical dimension of structures, profiles, or overlay. These measurements are used to facilitate process controls and/or yield efficiencies during the manufacture of semiconductor dies.

As semiconductor device pattern dimensions continue to shrink laterally and increase in the vertical direction, smaller metrology targets are often required. Furthermore, the requirements for measurement accuracy and matching to actual device characteristics increase the need for device-like targets as well as in-die and even on-device measurements. Various metrology implementations have been proposed to achieve these goals. For example, focused beam ellipsometry based on primarily reflective optics has been proposed. Apodizers can be used to mitigate the effects of optical diffraction causing the spread of the illumination spot beyond the size defined by geometric optics. The use of high-numerical-aperture tools with simultaneous multiple angle-of-incidence illumination is another way to achieve small-target capability to increase the measurement sensitivity.

Other measurement examples may include measuring the composition of one or more layers of the semiconductor stack, measuring certain defects on (or within) the wafer, and measuring the amount of photolithographic radiation exposed to the wafer. In some cases, a metrology tool and algorithm may be configured for measuring non-periodic targets.

To measure spectral reflectance from a semiconductor target in the mid-infrared spectral region, the reference spectrum and sample spectrum were acquired sequentially. In sequential mode, the reflectance spectra were more susceptible to system instability and environment change. Furthermore, the measurement time is longer. Due to the nature of the globar thermal source, it was difficult to increase the source brightness.

Therefore, improved systems and methods for semiconductor metrology are needed.

BRIEF SUMMARY OF THE DISCLOSURE

A system is provided in a first embodiment. The system includes a light source, a Fourier transform infrared reflectometer (FTIR) spectrometer; and broadband reflectometer optics. The system is configured to measure polarized light and unpolarized reflectivities in a wavelength range from 2 µm to 20 µm.

The spectroscopic reflectometer can include a single channel or two channels. If two channels are included then one of the two channels is a reference channel.

The light source may be a globar source or a laser-driven light source.

If a laser-drive light source is used, the FTIR spectrometer can includes an aperture, an infrared beamsplitter, a mirror partially disposed in a light path between the aperture and the infrared beamsplitter, and a reference infrared detector that receives light from the mirror.

The broadband reflectometer optics can include a beam splitter or a beam divider that splits a beam between an objective and a reference channel.

The system can further include a stage configured to hold a wafer and a vapor injection system. The vapor injection system is configured to apply a liquid to the wafer.

The system further comprises a two-color InSb and mercury cadmium telluride detector. The two-color InSb and mercury cadmium telluride detector can further include a Stirling cooler.

The system can further include a processor in electronic communication with the FTIR spectrometer.

A method is provided in a second embodiment. In the method, a beam of light is directed toward a wafer using a light source. The beam of light passes through broadband reflectometer optics. The beam of light is received at a spectroscopic reflectometer. The spectroscopic reflectometer is configured to measure polarized light and unpolarized reflectivities in a wavelength range from 2 µm to 20 µm. Measurements can be taken in parallel. For example, the reference spectrum and sample spectrum measurements can be taken in parallel.

The spectroscopic reflectometer can include a single channel or two channels. If two channels are included then of the two channels is a reference channel.

The broadband reflectometer optics can include a beam splitter or a beam divider that splits a beam between an objective and a reference channel. The method can include splitting the beam of light between an objective and a reference channel using the beam splitter or using the beam divider, respectively.

A liquid can be applied to the wafer using a vapor injection system.

The method can further include: acquiring a single beam interferogram of the wafer; performing, using a processor, a fast Fourier transform on the single beam interferogram thereby obtaining a single beam sample spectrum; acquiring an infrared source single beam interferogram; performing, using a processor, a fast Fourier transform on the infrared single beam interferogram thereby obtaining an infrared source single beam sample spectrum; determining, using the processor, a single beam reference spectrum of a system by multiplying the infrared source single beam sample spectrum to f(k) thereby obtaining a value; and determining, using the processor, a sample reflectivity by dividing the single beam sample spectrum by the value.

The method can further include: acquiring a single beam interferogram of the wafer; performing, using a processor, a fast Fourier transform on the single beam interferogram thereby obtaining a single beam sample spectrum; acquiring an infrared source single beam interferogram; performing, using a processor, a fast Fourier transform on the infrared single beam interferogram thereby obtaining an infrared source single beam sample spectrum; determining, using the processor, a single beam reference spectrum of a system by multiplying the infrared source single beam sample spectrum by $f(k)*R_{Au}(k)$ thereby obtaining a value; and determining, using the processor, a sample reflectivity by subtracting the value from the single beam sample spectrum to obtain a result and dividing the result by a product of the infrared source single beam sample spectrum and $f(k)*R_{Au}(k)$.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
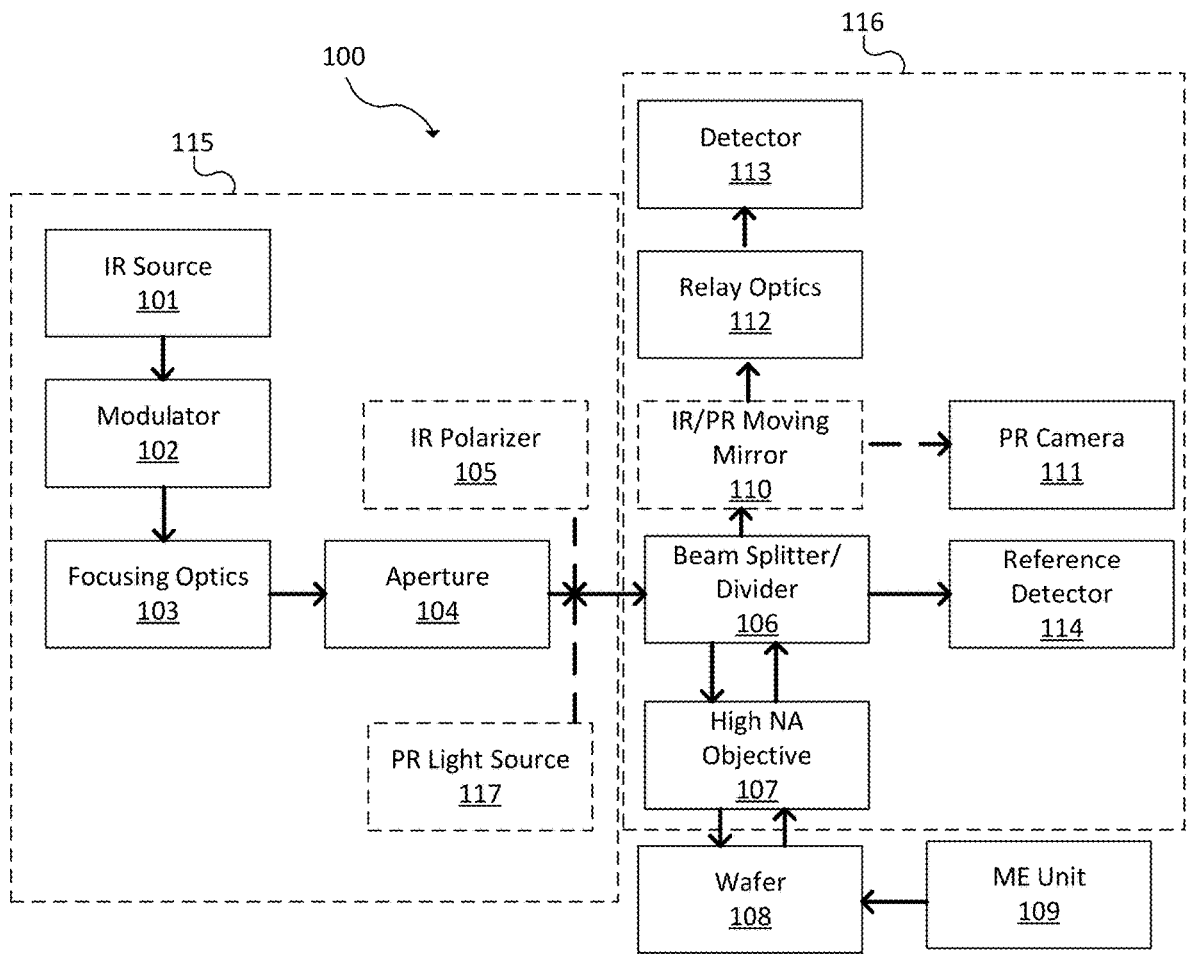
FIG. 1 is a block diagram of an embodiment of a system in accordance with the present disclosure.

Although claimed subject matter will be described in terms of certain embodiments, other embodiments, including embodiments that do not provide all of the benefits and features set forth herein, are also within the scope of this disclosure. Various structural, logical, process step, system architecture, and electronic changes may be made without departing from the scope of the disclosure. Accordingly, the scope of the disclosure is defined only by reference to the appended claims.

Continuous vertical integration of semiconductor devices imposes more difficult requirements for optical metrology systems. 3D NAND has a vertically structure in which horizontal layers of repeated memory cells are stacked and connected using small vertical channels. The height of stacked repeated memory cells is in the order of magnitude of several tens of micrometers. As the stack becomes higher, critical dimension variation from top to bottom becomes difficult to control during the process. Furthermore, a metrology tool using deep ultraviolet (DUV), ultraviolet, and visible light sources does not have enough sensitivity toward deep structures. Therefore, an inline metrology system sensitive to the process variation commensurable to structure dimension is needed. A broadband deep ultraviolet to near-infrared polarized optical metrology system with a light source that generates light from 190 nm to 2 μm may not be sufficient for metrology needs due to limited penetration depth of the light. Such a system may be unable to probe the complete vertical stack and, thus, starts to lose sensitivity toward high-aspect ratio (HAR) structure. Increasing a number of film stacks means a probe source with longer wavelength to penetrate the deep structure and opaque films may be needed. As the probing wavelength extends to mid-infrared, the light-material interaction presents possibilities beyond film thickness and high aspect ratio structure critical dimension. The spectra in the mid-infrared range can be used to measure free-carrier concentration (Drude model) in an epitaxial layer, and can have high chemical sensitivity toward organic materials. The latter can be used to monitor characteristic functional group change during photoresist develop processes, and can be used to monitor the chemical residuals.

Embodiments disclosed herein can extend broadband polarized optical metrology from near-infrared to mid-infrared to meet the semiconductor metrology requirements, such as from 2 μm to 20 μm. Furthermore, embodiments disclosed herein can obtain reference and sample spectra simultaneously, which reduces data acquisition time by half.

FTIR spectroscopy combined with infrared ellipsometry (IRSE) can solve many difficult metrology problems for doped epitaxial and implant applications such dopant dose in thin SiGe, SiP and SiCP epitaxial layers or ultra-shallow junction implant dose and depth. FTIR spectroscopy combined with infrared ellipsometry also can solve many difficult metrology problems with memory devices such as through silicon via critical dimension and shape; DRAM capacitor critical dimension and/or shape; stacked DRAM storage cell geometry; silicon/SiC epitaxy and composition; 3D NAND amorphous carbon layer (hardmask) film measurements; 3D NAND tungsten recess and channel hole profile measurements; amorphous carbon film thickness and/or geometry in trench and vias; poly recess; high-aspect ratio trench and via applications; and shallow and deep isolation trenches.

Embodiments disclosed herein can provide these benefits with one or more of the following concepts. A polarized Fourier transform infrared reflectometer (PFTIRR) in a mid-infrared range from 2 μm to 20 μm can be used with near-infrared ellipsometry to perform metrology in multi-environment (ME). PFTIRR has dual channels that provide simultaneous reference and sample single beam measurements. Thus, a spectral reflectivity of semiconductor structure can be obtained through fast Fourier transformation (FFT) of a single beam interferogram. A high brightness laser-driven light source (LDLS) can be used with PFTIRR to enable small spot metrology system with high signal-to-noise ratio. The PFTIRR can use a beam divider or beam splitter to direct a portion of focused beam to measure single beam signal reflected from the wafer and use the remaining portion of focused beam as reference single beam for simultaneous measurement. Thus, measurement time is improved by 2× and systematic error introduced by source instability is reduced or eliminated.

Alternatively, a portion of beam can be directed inside the interferometer using a mirror, such as a gold mirror. The mirror can direct the light to a reference detector. The signal from reference detector can be used to obtain the wafer spectral reflectance.

While a gold mirror is specifically disclosed, mirrors made from silver, aluminum, or other materials are possible. Gold may be more inert, but silver also has high reflectivity.

FIG. 1 is a block diagram of a system 100. The system 100 is a multi-environment polarized/unpolarized infrared reflectometer with broadband reflectometer optics 116 and an FTIR spectrometer 115. The system 100, which may be a polarized spectroscopic reflectometer in an example, includes a light source, such as the infrared source 101. The infrared source 101 can be, for example, a globar or LDLS. A beam of light from the light source can be directed through a modulator 102, focusing optics 103, and aperture 104. The system 100 can include an infrared polarizer 105.

An LDLS can include one or more lasers directed into a substantially optically transparent cell with a gas volume. A plasma is ignited from the gas volume at the focal point. The ignition of the plasma can be accomplished either by the lasers, by electrodes, or by other techniques. The visible and other spectrum light (such as ultraviolet light) emitted by the plasma can be collected by a reflector, which focuses the light to a collection point, where it is provided for whatever use for the system 100.

The system 100 also optionally includes a pattern recognition light source 117.

A beam splitter/divider 106 receives the beam of light. The beam splitter/divider 106 can be either a beam splitter or a beam divider. A beam splitter is an optical device that splits a beam of light in two. A beam divider is a knife edge-like device which physically blocks part of the beam to divide the beam. In contrast, a beam splitter allows the whole beam pass through, but part of the beam is reflected and part of the beam is transmitted.

The beam of light passes through the high numerical aperture objective 107 to the wafer 108. The wafer 108 is in communication with a multi-environment (ME) unit 109.

Some of the reflected light from the wafer 108 passes through the infrared/pattern recognition (PR) moving mirror 110. The infrared/pattern recognition moving mirror 110 can move in and out of the beam path to direct light to the pattern recognition camera 111. When in the beam path, some or all of the light from the infrared/pattern recognition moving mirror 110 is received by the pattern recognition camera 111. Some of the light from the infrared/PR moving mirror 110 passes through the relay optics 112 and is received by the detector 113. The infrared/pattern recognition moving mirror 110 is used to direct the light to pattern recognition path or to measurement path. Some of the light is received by the reference detector 114 during the reflectance measurement.

The detector 113 may include any light detection system known in the art suitable for implementation in a broadband spectrometer, ellipsometer, reflectometer, or scatterometer setting. In a general sense, any detector capable of measuring spectra across the visible, infrared, and/or ultraviolet spectral ranges is suitable for implementation in FIG. 1.

Figure 2:
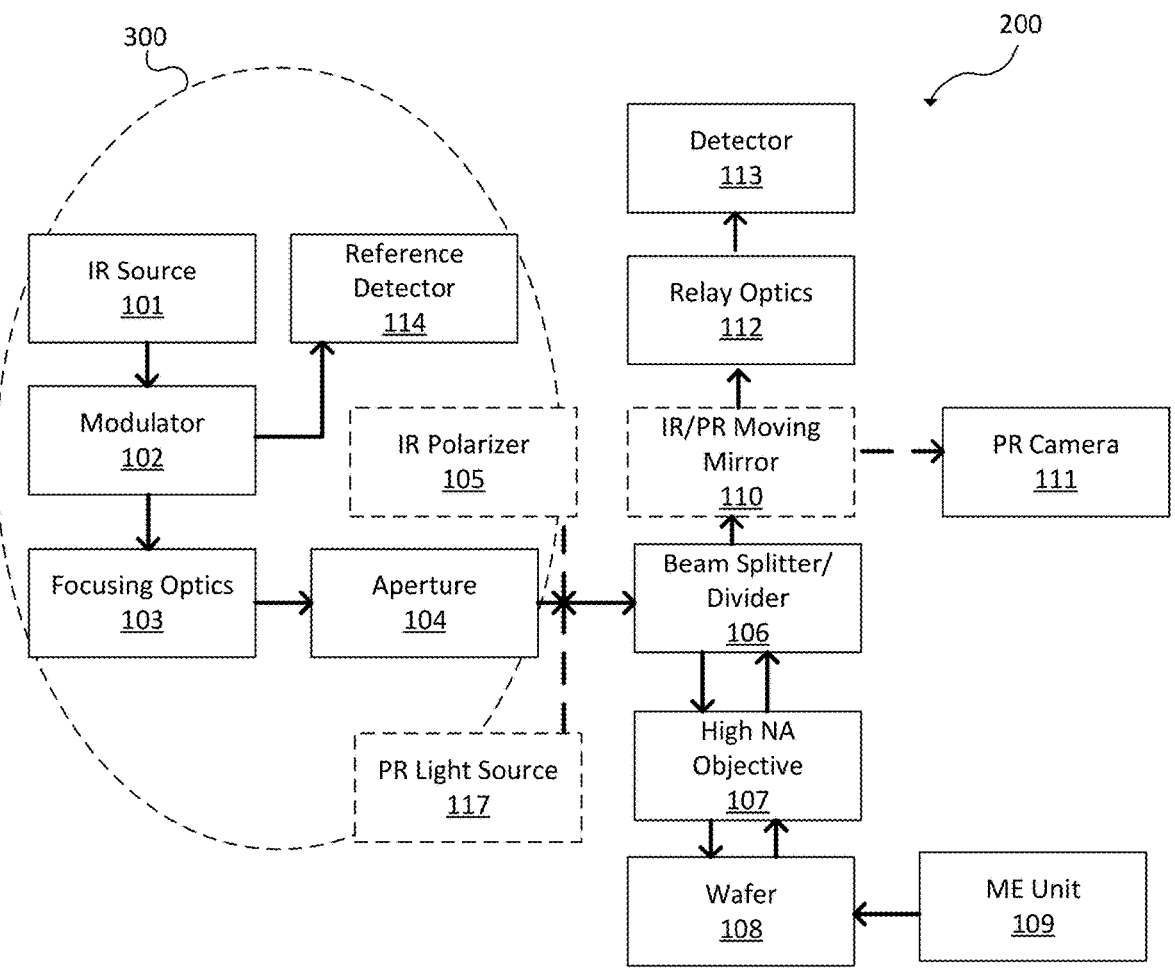
FIG. 2 is a block diagram of another embodiment of a system in accordance with the present disclosure.

FIG. 2 is a block diagram of a system 200. The system 200 is a multi-environment polarized/unpolarized infrared reflectometer. Unlike the system 100, the reference detector 114 in the system 200 receives light from the modulator 102. Thus, more light can reach the wafer 108.

Figure 3:
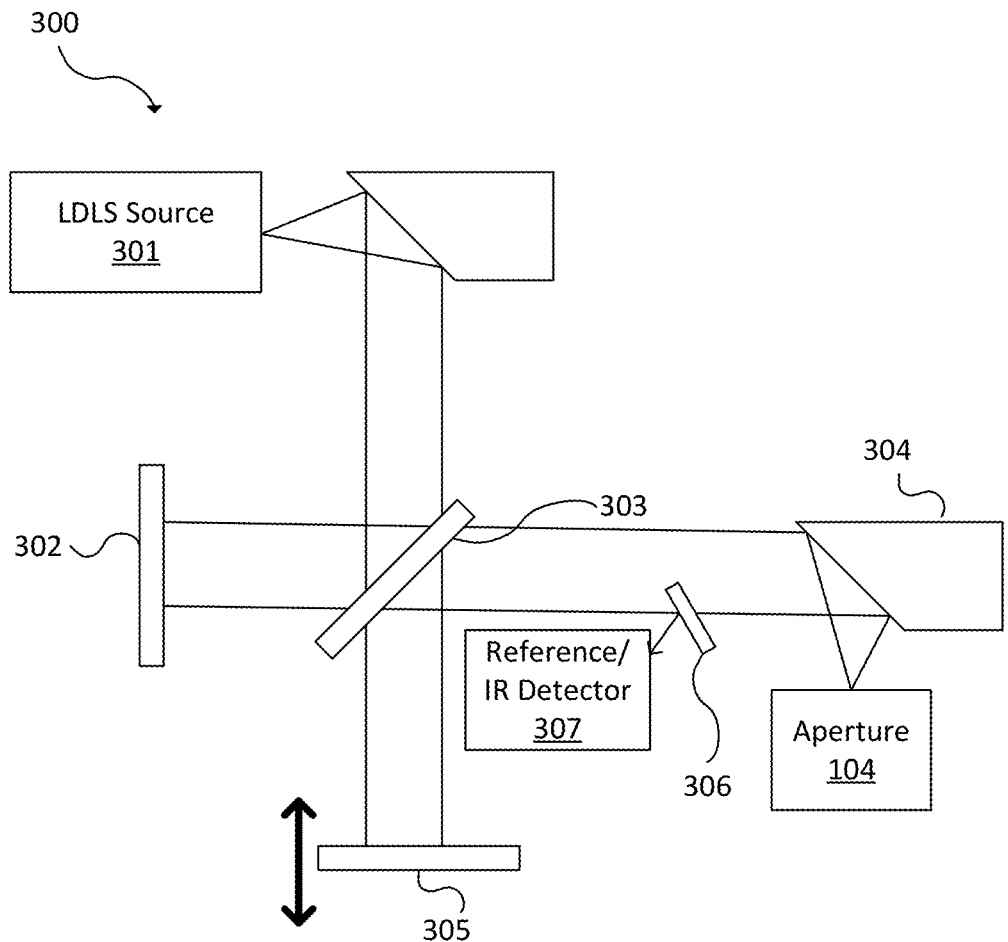
FIG. 3 is a block diagram of another embodiment of a system in accordance with the present disclosure.

FIG. 3 is a block diagram of a system 300, which is part of the system 200 in FIG. 2. The laser-driven light source 301 directs light to an infrared beamsplitter 303. Some light is received by a fixed mirror 302. Other light is received by a moving mirror 305, which can move relative to the infrared beamsplitter 303 as illustrated by the arrow. A reference infrared detector 307 receives some light from a gold mirror 306. Less signal is lost because the reference infrared detector 307 is upstream of the aperture 104. The focusing optics 304 directs some light to the aperture 104. In an instance, the reference infrared detector 307 is the reference detector 114 of FIG. 2.

Previously, the interferogram was measured without a sample in the beampath, either in transmission mode or in reflection mode. In the latter case, the wafer was replaced by a gold mirror. To obtain the reflectance, the interferogram of the gold mirror was first measured, followed by the measuring the interferogram of the wafer.

For a single beam reference signal in transmission mode, $I_r(t) = \int B(\tilde{k})(\exp(-j4\pi u\tilde{k}t) + \exp(j4\pi u\tilde{k}t))d\tilde{k}$. For a single beam reference signal in reflectance mode, $I_r(t) = \int R(\tilde{k})_{Au} B(\tilde{k})(\exp(-j4\pi u\tilde{k}t) + \exp(j4\pi u\tilde{k}t))d\tilde{k}$.

With a single beam sample signal, $I_s(t) = \int R(\tilde{k})_{sample} B(\tilde{k})(\exp(-j4\pi u\tilde{k}t) + \exp(j4\pi u\tilde{k}t))d\tilde{k}$, a sample reflectivity is $$R(\tilde{k}) = \frac{FFT(I_s)}{FFT(I_r)},$$

where $\tilde{k}$ is wavenumber, u is scanning speed of moving mirror of the interferometer, $B(\tilde{k})$ is spectral intensity of the output of interferometer as function of wavenumber $\tilde{k}$, $I_r$: reflected light intensity from Au reference target, $I_s$ is reflected light intensity from sample of interest, $R_{Au}$ is (intensity) reflectivity of a gold coating, $R_{sample}$ is (intensity) reflectivity of sample of interest, and t is time. FFT stands for Fast Fourier Transform.

The system of FIG. 1 sends a portion of the focused beam from the interferometer to the reference detector. The signal from reference detector serves as a single beam reference signal in transmission mode, enabling the simultaneous measurements to obtain reflectance spectra $R(\tilde{k})$ as opposed to previously sequential measurements. There may be a source brightness requirement because the reference beam is divided from the focused beam after the aperture. The aperture size may be determined by the spot size on wafer (i.e., the measurement spot size). For small a spot size metrology system, there may be a balance between the aperture size and the measurement signal-to-noise ratio (SNR). Any beam division after the aperture can reduce the light intensity that impinges on the wafer, therefore, reducing the signal-to-noise ratio. A source with sufficient brightness may be needed to maintain the small spot size and meet SNR requirements while performing simultaneous measurement as disclosed in FIG. 1, a source with sufficient brightness can be used.

Two embodiments that allow simultaneous measurement with a bright source, although these embodiments can accommodate potential low brightness of the conventional infrared source are disclosed. Other embodiments are possible.

In a first embodiment, the beam of light inside the interferometer is intercepted in collimated beam. This approach is illustrated in FIG. 3. A gold mirror 306 is placed in a collimated beam upstream to the focusing optics 304. The gold mirror 306 is at an angle to the collimated beam and directs small portion of the collimated beam to the reference infrared detector 307 as reference single beam $I_r(t)$. This arrangement can minimize light loss to the focused beam after the aperture 104 even for conventional thermal source with lower brightness. While disclosed as a goal mirror, a mirror of other materials is possible.

Figure 5:
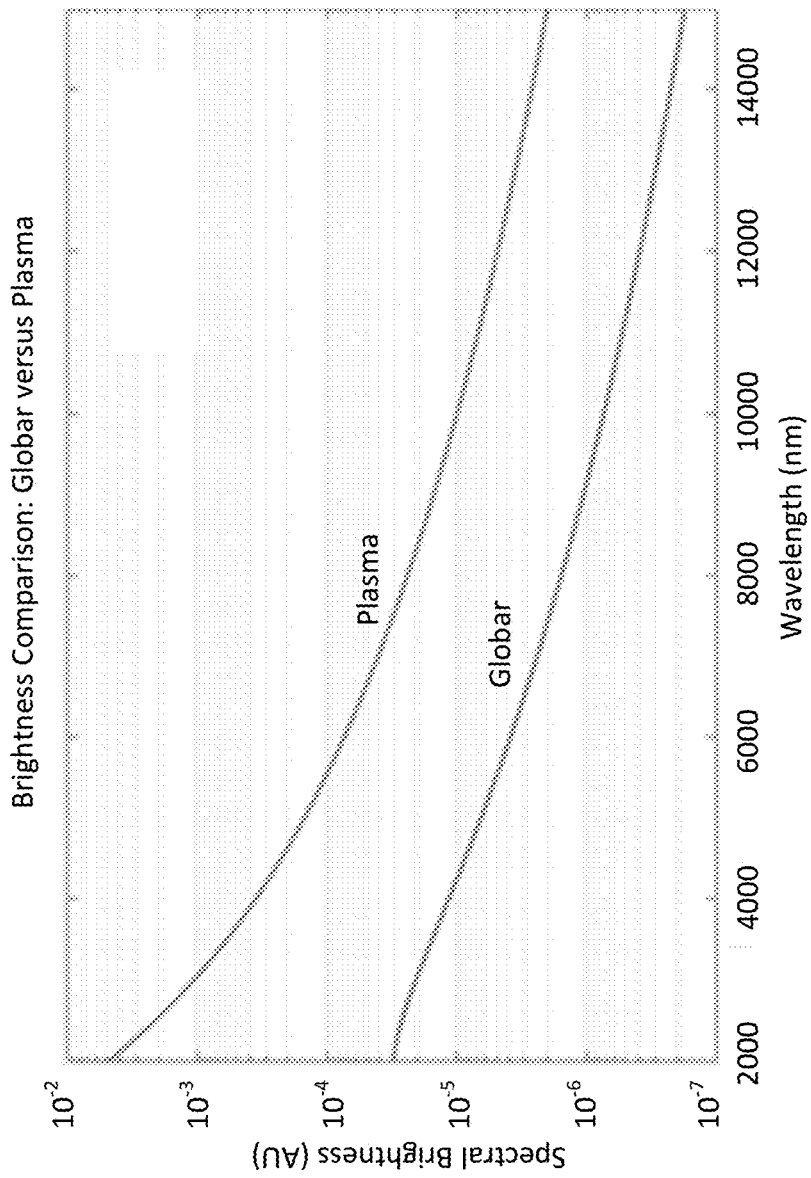
FIG. 5 is brightness comparison for a globar and laser-driven light source in a mid-infrared spectral range from 2 μm to 20 m.

The second embodiment combines the design of FIG. 3 with a high brightness infrared source. A Fourier transform infrared spectrometer can use a thermal source, such as a SiC thermal source (i.e., a globar), instead of the LDLS 301. Although the brightness of such a thermal source can be increased by increasing the source operating temperature, there may be practical limits to the temperature it can be operated at. Typical globar temperatures do not exceed from 1400 K to 2000 K to maintain thermal management, source stability, and lifetime. The LDLS 301 is an alternative to the thermal source. The LDLS 301 can generate 10× brightness improvement over a globar for the mid-infrared spectral region from approximate 2 µm to 20 µm as shown in FIG. 5. In the simulation of FIG. 5, LDLS emission peaked at 400 nm, which was for a plasma temperature higher than the globar temperature. The LDLS provided a 150X brightness increase at 2 m compared to a globar blackbody source and a 10× brightness increase at 15 µm compared to a globar blackbody source.

Figure 6:
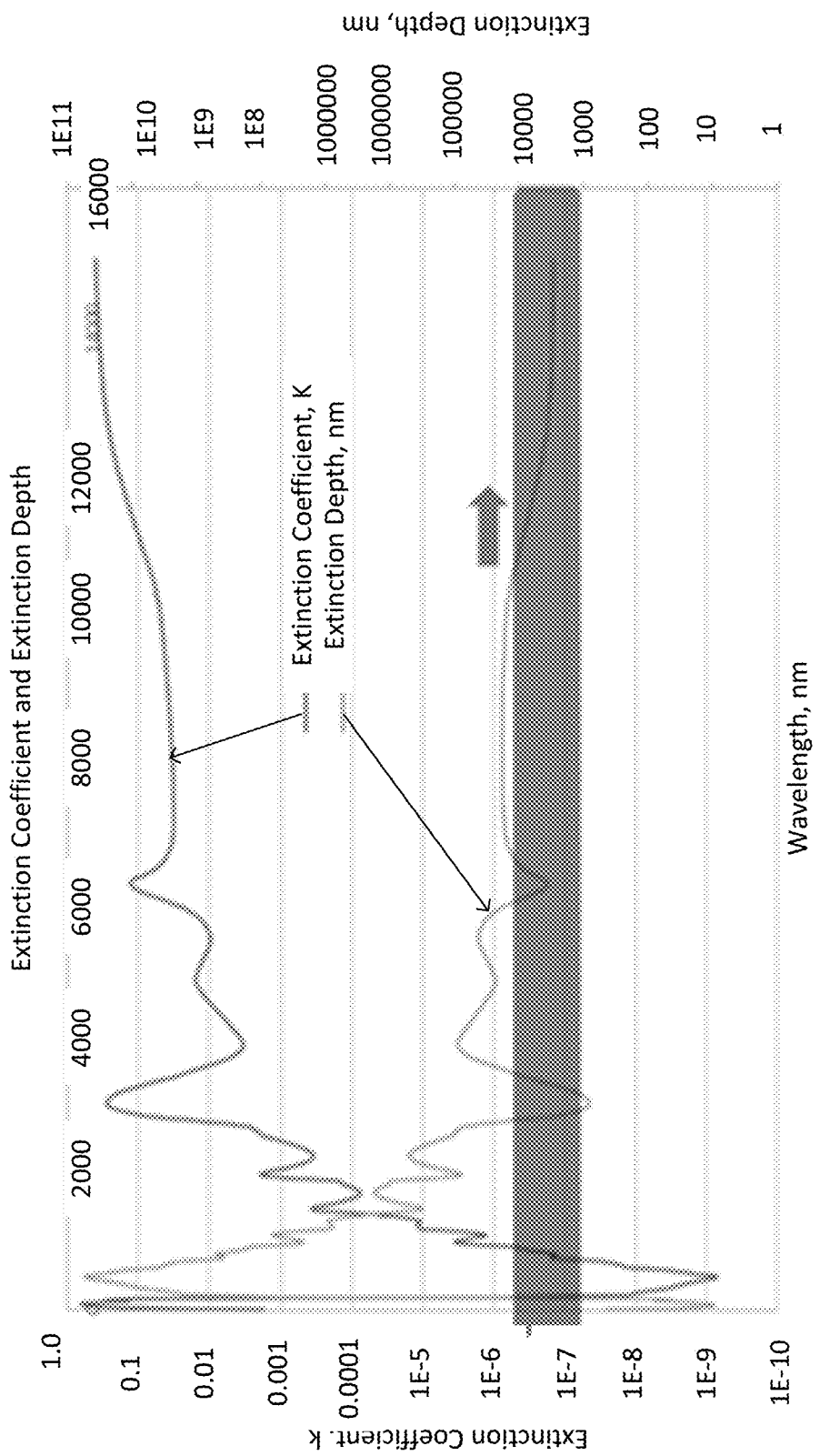
FIG. 6 shows absorption of light by water in the mid-infrared spectral range as measured by extinction coefficient k or extinction depth (nm)

FIG. 6 illustrates the potential enhancement of FTIR-based systems by combining the technique with the multi-environment method in which liquid fills the deep holes on a wafer. In FIG. 6, the extinction depth for light in the mid-infrared spectral range is plotted. The bar between 1000 and 10000 extinction depth represents the region where the extinction depth is smaller than the hole depth. In these spectral regions, the liquid in the holes will absorb the light and provide high contrast in the spectral signature that can be used to break correlations and improve critical dimension metrology. In FIG. 6, 2.7-3.5 µm, 6-6.5 µm, and greater than 12 µm absorbs greater than 99% of the light if the extinction depth is smaller than the hole depth.

Replacing a mid-infrared globar source with an LDLS can provide a brightness enhancement of 10×, can enable smaller measurement spot size, and can provide faster measurement throughput. By adding an infrared polarizer, the conventional FTIR becomes polarized Fourier transform infrared reflectometer, which can provide enhanced sensitivity to critical dimensions with high aspect ratio. By extending the optical metrology tool wavelength beyond 2 µm and, thus, increasing the light penetration depth and probing depth in materials, metrology on a thick, highly absorbing film stack or 3D vertical semiconductor device is possible. The measurement sensitivity can be further enhanced by combining the polarized Fourier transform infrared reflectometer with infrared ellipsometry (IRSE). By introducing multi-environment into the polarized Fourier transform infrared reflectometer, the metrology sensitivity can be further enhanced and parameter correlation can be reduced.

Embodiments disclosed herein also can have chemical sensitivity toward polymers and organic materials, such as photoresist. For chemical sensitivity, the polarized Fourier transform infrared spectrometer can be operated in reflection-absorption mode, instead of reflection mode, to enhance the chemical sensitivity. The reflection-absorption signal can be extracted from $I_r(t)$ and $I_s(t)$, which results in the following equations.

$$I_r(t) = \int R(\tilde{k})_{Au} B(\tilde{k})(\exp(-j4\pi u \tilde{k} t) + \exp(j4\pi u \tilde{k} t)) d\tilde{k}$$

$$I_s(t) = \int R(\tilde{k})_{sample} B(\tilde{k})(\exp(-j4\pi u \tilde{k} t) + \exp(j4\pi u \tilde{k} t)) d\tilde{k}$$

Sample reflection-absorption calculated as $$RA(\tilde{k}) = \frac{FFT(I_s) - FFT(I_r)}{FFT(I_r)}$$

enhances the absorption of the material characteristic to the chemical bonding.

Thus, in the embodiments disclosed herein, a system can include a spectroscopic reflectometer configured to measure polarized light and unpolarized reflectivities in a wavelength range from 2 µm to 20 µm. The spectroscopic reflectometer can be a polarized system by adding polarizers. The system also can include an FTIR spectrometer and broadband reflectometer optics. The light source in the system can be a globar or an LDLS. The broadband reflectometer optics can include a beam splitter or a beam divider that splits the beam between and objective and a reference channel as well as polarizers.

The spectroscopic reflectometer can include a single channel or two channels. If two channels are used, then one of the channels is a reference channel. The single channel measures the reflected intensity from the wafer as well as reflected intensity from a reference mirror in sequential mode.

The system can further include a stage configured to hold a wafer and a vapor injection system, such as the multi-environment unit 109. The vapor injection system is configured to apply a liquid to the wafer. Liquid filling can provide enhanced critical dimension measurements by enhancing the absorption of light in specific wavebands in the infrared.

The vapor injection system can be configured to provide a gaseous flow to the wafer during measurement. In one aspect, gaseous flow includes a purge gas and a fill material vaporized in the purge gas. When the gaseous flow comes into contact with the structure of the wafer, adsorption takes place and a portion of the fill material (i.e., the condensate) condenses onto structure on the wafer under measurement. The condensate fills at least a portion of one or more structural features of the structure on the wafer. The presence of the condensate changes the optical properties of the measured structure.

In some embodiments, a measurement is performed when the purge gas flow does not include fill material (e.g., pure nitrogen gas or clean dry air), and another measurement is performed when the purge gas flow includes fill material such that the condensate completely fills the openings between the structural features under measurement. The measurement data collected from these two measurements is communicated to processor and an estimate of one or more structural parameters of interest is made based on both sets of measurement data.

In some embodiments, a series of measurements are performed under different adsorption conditions such that the amount of condensation onto the structural features under measurement is different for each measurement. The measurement data collected from the series of measurements is communicated to a processor and an estimate of one or more structural parameters of interest is made based on the collected measurement data.

The gaseous flow can be provided locally to the structure on the wafer under measurement. However, in general, the gaseous flow may be provided over the entire wafer, through any portion of the beam path from the illumination source to the detector, or any combination thereof.

In general, any suitable purge gas and fill material may be selected for use in performing measurements as described herein. Exemplary purge gases include inert gases, nitrogen, and clean dry air. The selection of suitable purge gas may be driven primarily by availability in a semiconductor fabrication facility. Exemplary fill materials include water, ethanol, isopropyl alcohol, methanol, benzene, toluene, etc. The selection of suitable fill materials may be driven by the ability to control vapor pressure, void filling characteristics, optical characteristics, and any chemical interactions between the fill material and the structure under measurement.

The system can include a two-color InSb and mercury cadmium telluride detector and a Stirling cooler. The components can be incorporated into one or more of the detectors illustrated in FIGS. 1, 2, and 3.

Thus, a polarized, spectroscopic reflectometer based on the combination of a FTIR spectroscopy can be used with broadband reflectometer optics to measure polarized/unpolarized reflectivities of materials in the 2-20 µm wavelength range.

The spectral reflectivity of the wafer can be measured by comparing the spectral intensity distribution against a known reflectivity standard such as a reference target (e.g., a gold mirror).

Figure 4:
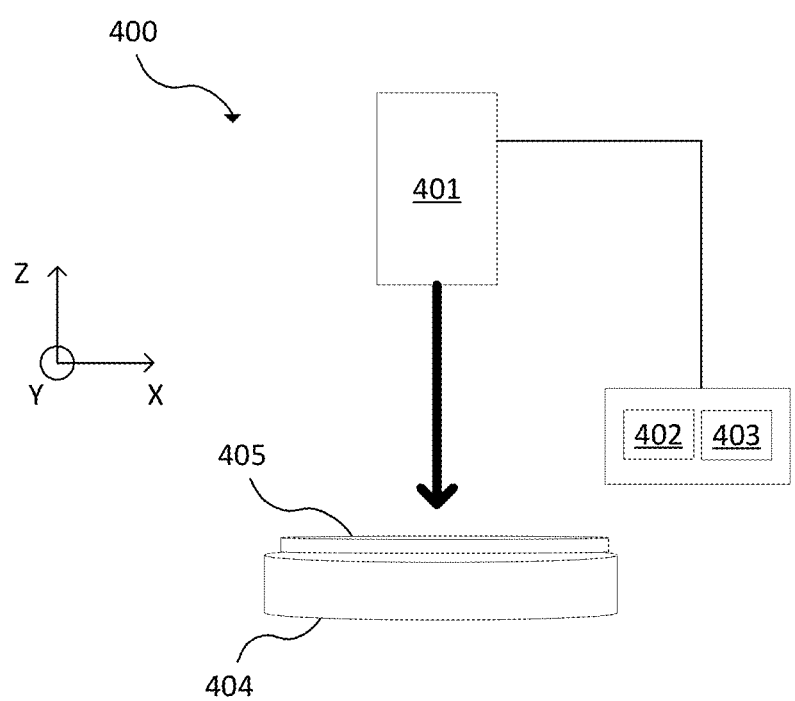
FIG. 4 is diagram of a system in accordance with the present embodiment.

FIG. 4 is a diagram of a system 400. The measurement system 401 may produce a beam of light or may use other techniques to measure a surface of the wafer 405. In one example, the measurement system 401 includes a laser, lamp, globar, or LDLS. In another example, the wafer metrology tool 400 is a broad-band plasma inspection tool and the measurement system 401 includes a broad-band plasma source. The measurement system 401 can provide information about the wafer 405 or can provide information used to form images of the wafer 405. The wafer 405 may be on a stage 404.

In particular, the wafer metrology tool 400 or measurement system 401 can be configured to provide one or more of rotating polarizer rotating compensator spectroscopic ellipsometry data, full Mueller matrix components data, rotating polarizer spectroscopic ellipsometry data, reflectometry data, laser driven spectroscopic reflectometry data, or X-ray data.

The wafer metrology tool 400 can include an embodiment of the system 100 or system 200. The wafer 405 can be the wafer 108.

In an instance, the wafer metrology tool 400 provides spectroscopic ellipsometry using a broadband light source, a measurement system 401 that measures how the light source interacts with the target, and processing algorithms that extract the relevant parameters of the target. In another instance, the source may be a laser driven light source, which can provide high intensities and increase the signal-to-noise ratio at the detector, as opposed to a Xe lamp. In an example, the collection system includes a series of polarizers (rotating or fixed), compensators (rotating or fixed), detectors, spectrometers, cameras, lenses, mirrors, and/or collimators. To enhance target signatures, the system may use $N_2$ or Ar gas purge to extend the wavelength range to 170 nm or below.

The wafer metrology tool 400 communicates with a processor 402 and an electronic data storage unit 403 in electronic communication with the processor 402. For example, the processor 402 can communicate with the measurement system 401 or other components of the wafer metrology tool 400. The processor 402 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 402 to implement various methods and functions may be stored in controller readable storage media, such as a memory in the electronic data storage unit 403, within the processor 402, external to the processor 402, or combinations thereof.

While only one processor 402 and electronic data storage unit 403 are illustrated, more than one processor 402 and/or more than one electronic data storage unit 403 can be included. Each processor 402 may be in electronic communication with one or more of the electronic data storage units 403. In an embodiment, the one or more processors 402 are communicatively coupled. In this regard, the one or more processors 402 may receive readings received at the measurement system 401 and store the reading in the electronic data storage unit 403 of the processor 402. The processor 402 and/or electronic data storage unit 403 may be part of the wafer metrology tool 400 itself or may be separate from the wafer metrology tool 400 (e.g., a standalone control unit or in a centralized quality control unit).

For example, the processor 402 can be in electronic communication with a spectroscoping reflectometer and an FTIR spectrometer in the measurement system 401.

The processor 402 may be coupled to the components of the wafer metrology tool 400 in any suitable manner (e.g., via one or more transmission media, which may include wired and/or wireless transmission media) such that the processor 402 can receive the output generated by the wafer metrology tool 400, such as output from the measurement system 401. The processor 402 may be configured to perform a number of functions using the output. For instance, the processor 402 may be configured to measure layers on the wafer 405. In another example, the processor 402 may be configured to send the output to an electronic data storage unit 403 or another storage medium without reviewing the output. The processor 402 may be further configured as described herein.

The processor 402, other system(s), or other subsystem(s) described herein may take various forms, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool. For example, the processor 402 may include a microprocessor, a microcontroller, or other devices.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 402 also may be part of a defect review system, an inspection system, a metrology system, or some other type of system. Thus, the embodiments disclosed herein describe some configurations that can be tailored in a number of manners for systems having different capabilities that are more or less suitable for different applications.

The processor 402 may be in electronic communication with the measurement system 401 or other components of the wafer metrology tool 400. The processor 402 may be configured according to any of the embodiments described herein. The processor 402 also may be configured to perform other functions or additional steps using the output of the measurement system 401 or using images, measurements, or data from other sources.

In another embodiment, the processor 402 may be communicatively coupled to any of the various components or sub-systems of wafer metrology tool 400 in any manner known in the art. Moreover, the processor 402 may be configured to receive and/or acquire data or information from other systems (e.g., inspection results from an inspection system such as a review tool, another metrology tool, a remote database including design data and the like) by a transmission medium that may include wired and/or wireless portions. In this manner, the transmission medium may serve as a data link between the processor 402 and other subsystems of the wafer metrology tool 400 or systems external to wafer metrology tool 400.

In some embodiments, various steps, functions, and/or operations of wafer metrology tool 400 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single processor 402 (or computer system) or, alternatively, multiple processors 202 (or multiple computer systems). Moreover, different sub-systems of the wafer metrology tool 400 may include one or more computing or logic systems. Therefore, the above description should not be interpreted as a limitation on the present disclosure, but merely an illustration.

In an instance, the wafer metrology tool 400 in FIG. 4 may include an illumination system which illuminates a target; a measurement system 401 which captures relevant information provided by the illumination system's interaction (or lack thereof) with a target, device, or feature on the wafer 405; and a processor 402 which analyzes the information collected using one or more algorithms.

While illustrated as on the same axis in FIG. 4, the beam of light from a light source of the measurement system 401 may be directed at the wafer 405 at an angle and can be reflected from the wafer 405 to a detector of the measurement system 401 at a different angle.

The wafer metrology tool 400 can include one or more hardware configurations which may be used to measure the various semiconductor structural and material characteristics. Examples of such hardware configurations include, but are not limited to, a spectroscopic ellipsometer (SE); an SE with multiple angles of illumination; an SE measuring Mueller matrix elements (e.g., using rotating compensator (s)); a single-wavelength ellipsometers; a beam profile ellipsometer (angle-resolved ellipsometer); a beam profile reflectometer (angle-resolved reflectometer); a broadband reflective spectrometer (spectroscopic reflectometer); a single-wavelength reflectometer; an angle-resolved reflectometer; an imaging system; or a scatterometer (e.g., speckle analyzer). The hardware configurations can be separated into discrete operational systems or can be combined into a single tool.

The illumination system of certain hardware configurations can include one or more light sources. The light source may generate light having only one wavelength (i.e., monochromatic light), light having a number of discrete wavelengths (i.e., polychromatic light), light having multiple wavelengths (i.e., broadband light), and/or light the sweeps through wavelengths, either continuously or hopping between wavelengths (i.e., tunable sources or swept source). Examples of suitable light sources are: a white light source, an ultraviolet (UV) laser, an arc lamp or an electrode-less lamp, a laser sustained plasma (LSP) source, a supercontinuum source such as a broadband laser source, shorter-wavelength sources such as X-ray sources, extreme UV sources, or some combination thereof. The light source may also be configured to provide light having sufficient brightness, which in some cases may be a brightness greater than about 1 W/(nm cm$^2$ Sr). The wafer metrology tool 400 may also include a fast feedback to the light source for stabilizing its power and wavelength. Output of the light source can be delivered via free-space propagation, or in some cases delivered via optical fiber or light guide of any type.

The wafer metrology tool 400 may be designed to make many different types of measurements related to semiconductor manufacturing. For example, in certain embodiments the wafer metrology tool 400 may measure characteristics of one or more targets, such as critical dimension, overlay, sidewall angles, film thicknesses, or process-related parameters (e.g., focus and/or dose). The targets can include certain regions of interest that are periodic in nature, such as gratings in a memory die. Targets can include multiple layers (or films) whose thicknesses can be measured by the wafer metrology tool 400. Targets can include target designs placed (or already existing) on the semiconductor wafer for use, such as with alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or at differing times) by the same or multiple metrology tools. The data from such measurements may be combined. Data from the metrology tool can be used in the semiconductor manufacturing process, for example, to feed-forward, feed-backward, and/or feed-sideways corrections to the process (e.g., lithography, etch) and, therefore, can yield a complete process control solution.

To improve measurement accuracy and matching to actual device characteristics and to improve in-die or on-device measurements, various metrology implementations can be used. For example, focused beam ellipsometry based on primarily reflective optics can be used. Apodizers can be used to mitigate the effects of optical diffraction causing the spread of the illumination spot beyond the size defined by geometric optics. The use of high-NA tools with simultaneous multiple area of interest illumination is another way to achieve small-target capability. Other measurement examples may include measuring the composition of one or more layers of the semiconductor stack, measuring certain defects on (or within) the wafer, and measuring the amount of photolithographic radiation exposed to the wafer. In some cases, a metrology tool and algorithm may be configured for measuring non-periodic targets.

Measurement of parameters of interest usually involves a number of algorithms. For example, optical interaction of the incident beam with the sample can be modeled using an electro-magnetic (EM) solver and can use algorithms such as rigorous coupled-wave analysis (RCWA), finite element method (FEM), method of moments, surface integral method, volume integral method, finite-difference time-domain (FDTD), and others. The target of interest is usually modeled (parametrized) using a geometric engine, or in some cases, process modeling engine or a combination of both. A geometric engine can be implemented, such as the AcuShape software product of KLA Corporation.

Collected data can be analyzed by a number of data fitting and optimization techniques and technologies including: libraries; fast-reduced-order models; regression; machine-learning algorithms such as neural networks and support-vector machines (SVM); dimensionality-reduction algorithms such as principal component analysis (PCA), independent component analysis (ICA), and local-linear embedding (LLE); sparse representation such as Fourier or wavelet transform; Kalman filter; algorithms to promote matching from same or different tool types; and others. Collected data can also be analyzed by algorithms that do not include modeling, optimization and/or fitting.

Computational algorithms are usually optimized for metrology applications with one or more approaches being used such as design and implementation of computational hardware, parallelization, distribution of computation, load-balancing, multi-service support, or dynamic load optimization. Different implementations of algorithms can be done in firmware, software, field programmable gate array (FPGA), and programmable optics components, etc.

The data analysis and fitting steps usually pursue one or more goals. For example, the goal may be measurement of critical dimension, sidewall angle (SWA), shape, stress, composition, films, bandgap, electrical properties, focus/dose, overlay, generating process parameters (e.g., resist state, partial pressure, temperature, and focusing model), and/or any combination thereof. The goal may be modeling and/or design of metrology systems. The goal also may be modeling, design, and/or optimization of metrology targets.

Embodiments of the present disclosure address the field of semiconductor metrology and are not limited to the hardware, algorithm/software implementations and architectures, and use cases summarized above.

Figure 7:
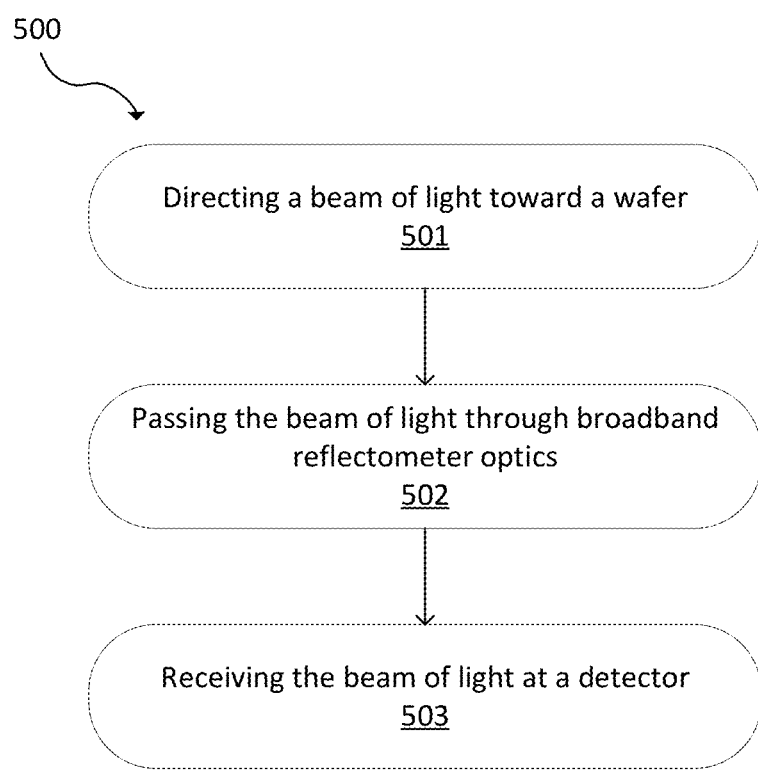
FIG. 7 is a flowchart of an embodiment of a method in accordance with the present disclosure.

FIG. 7 is a flowchart of an embodiment of a method 500. A beam of light is directed toward a wafer using a light source at 501. At 502, the beam of light is passed through broadband reflectometer optics. At 503, the beam of light is received at a spectroscopic reflectometer. The spectroscopic reflectometer is configured to measure polarized light and unpolarized reflectivities in a wavelength range from 2 µm to 20 µm. The spectroscopic reflectometer can be polarized.

Measurements can be taken in parallel. Thus, measurements can be taken by the various detectors, such as those illustrated in FIG. 1 or FIG. 2, in a non-sequential manner.

The spectroscopic reflectometer can include a single channel or two channels. With two channels, one of the two channels is a reference channel.

The broadband reflectometer optics can include a beam splitter or a beam divider. The beam of light can be split between an objective and a reference channel using the beam splitter or the beam divider.

Liquid can be applied to the wafer using a vapor injection system in the method 500. For example, water vapor can be added to the gas around the wafer. An infrared spectral region can be strong with water, such as from 2.4 µm to 10 µm or 2.4 µm to 12 µm with FTIR.

Figure 8:
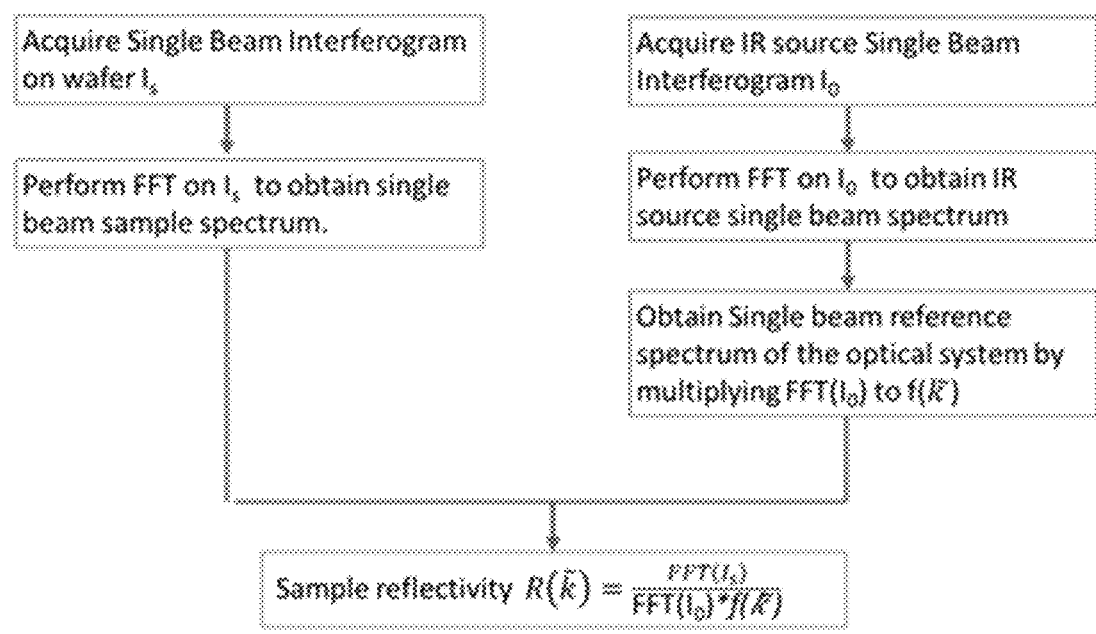
FIG. 8 is a flowchart of an embodiment of a measurement sequence in reflectance mode.

As shown in FIG. 8, the method can further include acquiring a single beam interferogram of the wafer; performing, using a processor, a fast Fourier transform on the single beam interferogram thereby obtaining a single beam sample spectrum; acquiring an infrared source single beam interferogram; performing, using a processor, a fast Fourier transform on the infrared single beam interferogram thereby obtaining an infrared source single beam sample spectrum; determining, using the processor, a single beam reference spectrum of a system by multiplying the infrared source single beam sample spectrum to f(k) thereby obtaining a value; and determining, using the processor, a sample reflectivity by dividing the single beam sample spectrum by the value.

Figure 9:
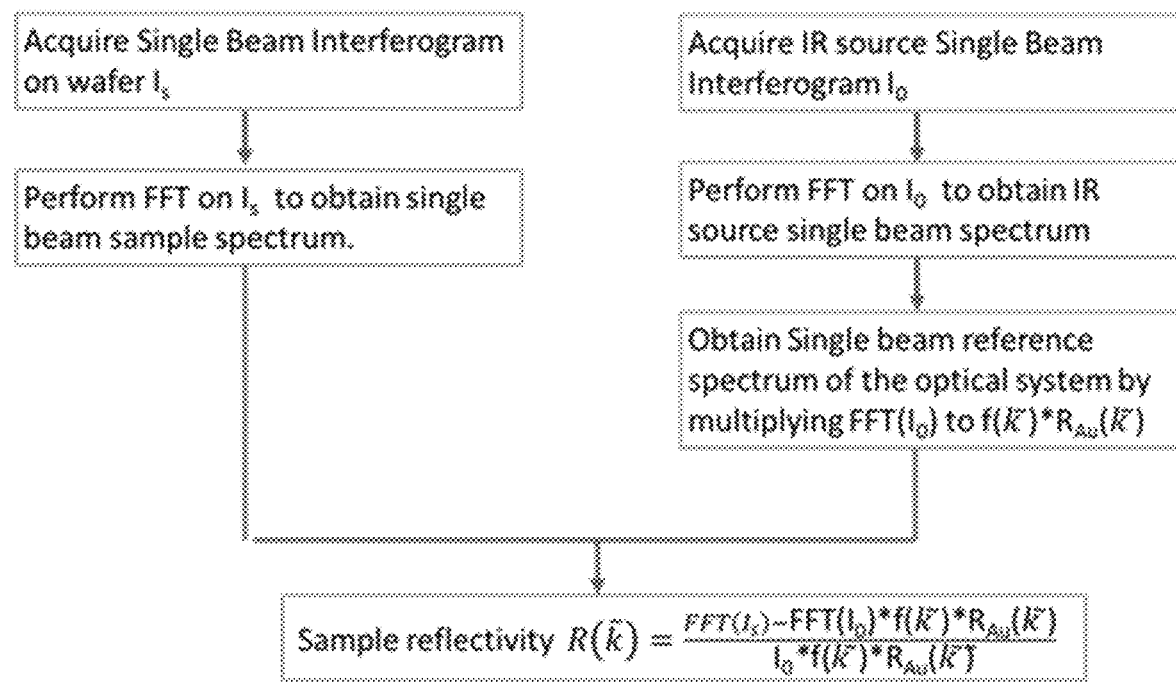
FIG. 9 is a flowchart of an embodiment of a measurement sequence in reflection-absorption mode.

As shown in FIG. 9, the method can further include acquiring a single beam interferogram of the wafer; performing, using a processor, a fast Fourier transform on the single beam interferogram thereby obtaining a single beam sample spectrum; acquiring an infrared source single beam interferogram; performing, using a processor, a fast Fourier transform on the infrared single beam interferogram thereby obtaining an infrared source single beam sample spectrum; determining, using the processor, a single beam reference spectrum of a system by multiplying the infrared source single beam sample spectrum by f(k)*RAu(k) thereby obtaining a value; and determining, using the processor, a sample reflectivity by subtracting the value from the single beam sample spectrum to obtain a result and dividing the result by a product of the infrared source single beam sample spectrum and f(k)*RAu(k).

The systems and methods disclosed herein can be used to measure film thickness, critical dimension, or other variables.

Each of the steps of the method may be performed as described herein. The methods also may include any other step(s) that can be performed by the processor and/or computer subsystem(s) or system(s) described herein. The steps can be performed by one or more processors, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
 a light source;
 a stage configured to hold a wafer;
 a Fourier transform infrared reflectometer (FTIR) spectrometer configured to receive light from the light source; and
 broadband reflectometer optics configured to receive the light from the FTIR spectrometer, wherein the system is configured to measure polarized light and unpolarized reflectivities of the wafer in a wavelength range from 2 μm to 20 μm.

2. The system of claim 1, wherein the broadband reflectometer optics includes a single channel.

3. The system of claim 1, wherein the broadband reflectometer optics includes two channels, and wherein one of the two channels is a reference channel.

4. The system of claim 1, wherein the light source is a globar source.

5. The system of claim 1, wherein the light source is a laser-driven light source.

6. The system of claim 5, wherein the FTIR spectrometer includes an aperture, an infrared beamsplitter, a mirror partially disposed in a light path between the aperture and the infrared beamsplitter, and a reference infrared detector that receives light from the mirror.

7. The system of claim 1, wherein the broadband reflectometer optics include a beam splitter that splits a beam between an objective and a reference channel.

8. The system of claim 1, wherein the broadband reflectometer optics include a beam divider that splits a beam between an objective and a reference channel.

9. The system of claim 1, further comprising:
 a vapor injection system, wherein the vapor injection system is configured to apply a liquid to the wafer.

10. The system of claim 1, further comprising a two-color InSb and mercury cadmium telluride detector.

11. The system of claim 10, wherein the two-color InSb and mercury cadmium telluride detector further comprises a Stirling cooler.

12. The system of claim 1, further comprising a processor in electronic communication with the FTIR spectrometer.

13. A method comprising:
 directing a beam of light toward a wafer using a light source;
 passing the beam of light reflected from the wafer through broadband reflectometer optics;
 receiving the beam of light reflected from the wafer at a spectroscopic reflectometer, wherein the spectroscopic reflectometer is configured to measure polarized light and unpolarized reflectivities of the wafer in a wavelength range from 2 μm to 20 μm, and wherein measurements of a reference spectrum and a sample spectrum are taken in parallel.

14. The method of claim 13, wherein the spectroscopic reflectometer includes a single channel.

15. The method of claim 13, wherein the spectroscopic reflectometer includes two channels, and wherein one of the two channels is a reference channel.

16. The method of claim 13, wherein the broadband reflectometer optics include a beam splitter, and further comprising splitting the beam of light between an objective and a reference channel using the beam splitter.

17. The method of claim 13, wherein the broadband reflectometer optics include a beam divider, and further comprising splitting the beam of light between an objective and a reference channel using the beam divider.

18. The method of claim 13, further comprising applying a liquid to the wafer using a vapor injection system.

19. The method of claim 13, further comprising:
 acquiring a single beam interferogram of the wafer;
 performing, using a processor, a fast Fourier transform on the single beam interferogram thereby obtaining a single beam sample spectrum;
 acquiring an infrared source single beam interferogram;
 performing, using a processor, a fast Fourier transform on the infrared single beam interferogram thereby obtaining an infrared source single beam sample spectrum;
 determining, using the processor, a single beam reference spectrum of a system by multiplying the infrared source single beam sample spectrum to $f(k)$ thereby obtaining a value; and
 determining, using the processor, a sample reflectivity by dividing the single beam sample spectrum by the value.

20. The method of claim 13, further comprising:
 acquiring a single beam interferogram of the wafer;
 performing, using a processor, a fast Fourier transform on the single beam interferogram thereby obtaining a single beam sample spectrum;
 acquiring an infrared source single beam interferogram;
 performing, using a processor, a fast Fourier transform on the infrared single beam interferogram thereby obtaining an infrared source single beam sample spectrum;
 determining, using the processor, a single beam reference spectrum of a system by multiplying the infrared source single beam sample spectrum by $f(k)*R_{Au}(k)$ thereby obtaining a value; and
 determining, using the processor, a sample reflectivity by subtracting the value from the single beam sample spectrum to obtain a result and dividing the result by a product of the infrared source single beam sample spectrum and $f(k)*R_{Au}(k)$.

* * * * *